No. 726,551. PATENTED APR. 28, 1903.
G. H. LLOYD.
TANK.
APPLICATION FILED MAR. 21, 1903.
NO MODEL. 2 SHEETS—SHEET 1.

Attest:
Edward Saxton

Inventor:
George Herbert Lloyd.
by Ellis Spear, his Atty's

No. 726,551. PATENTED APR. 28, 1903.
G. H. LLOYD.
TANK.
APPLICATION FILED MAR. 21, 1903.
NO MODEL. 2 SHEETS—SHEET 2.

Attest:
Edward Santon

Inventor
George Herbert Lloyd

UNITED STATES PATENT OFFICE.

GEORGE HERBERT LLOYD, OF BIRMINGHAM, ENGLAND.

TANK.

SPECIFICATION forming part of Letters Patent No. 726,551, dated April 28, 1903.

Original application filed August 15, 1902, Serial No. 119,813. Divided and this application filed March 21, 1903. Serial No. 148,898. (No model.)

*To all whom it may concern:*

Be it known that I, GEORGE HERBERT LLOYD, a subject of the King of Great Britain and Ireland, residing at Atlas Works, Spring Hill, Birmingham, England, have invented certain new and useful Improvements in Tanks, (for which I have made application for Letters Patent in Great Britain, No. 22,900, bearing date November 13, 1901; in Germany, dated September 10, 1902, and which I have divided out from my application in the United States, Serial No. 119,813, filed August 15, 1902,) of which the following is a specification.

My invention relates to improvements in tanks or other vessels composed of a plurality of sheet-metal sections or plates adapted to be assembled and bolted or riveted together.

The object of the invention is to provide a construction whereby with a minimum number of shapes of plates or sections tanks or vessels of a maximum number of sizes may be readily built.

The invention is illustrated in the accompanying drawings, in which—

Figure 1:
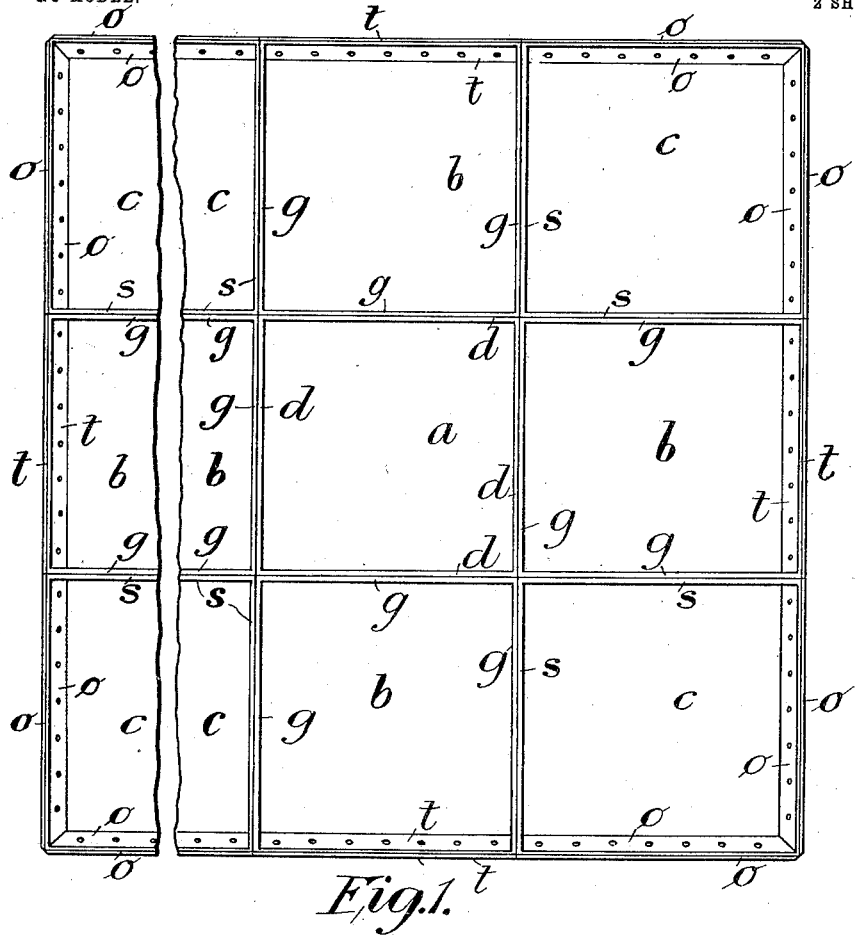
Figure 2:
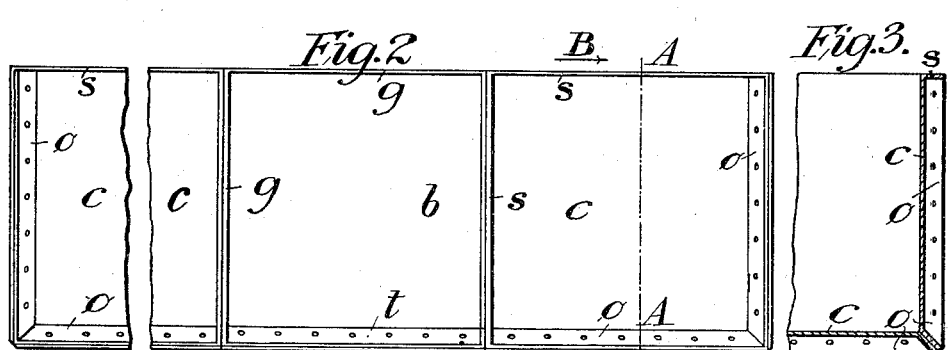
Figure 3:
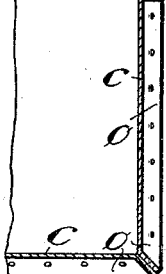
Figures 4, 4A:
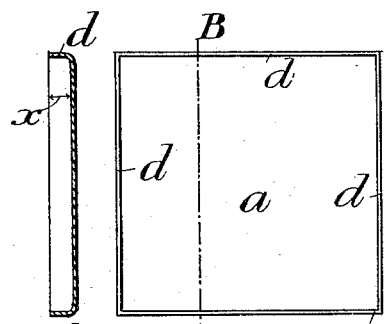
Figures 5, 5A, 6, 6A:
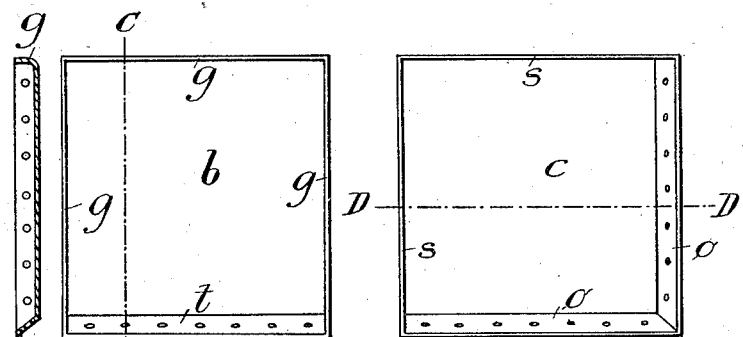

Figure 1 is a bottom plan view of a tank constructed according to the invention. Fig. 2 is an end view of the same. Fig. 3 is a part sectional view on the line A A of Fig. 2. Fig. 4 is a plan view of one of the individual plates used in forming the bottom of a tank such as that shown in Fig. 1 or in forming the sides where the tank is two or more plates or sections high. Fig. $4^a$ is a section on the line B B of Fig. 4. Fig. 5 is a plan of a plate provided with three square flanges and one beveled flange. Fig. $5^a$ is a section on the line C C of Fig. 5. Fig. 6 is a plan of a plate provided with two adjacent square flanges and two beveled flanges. Fig. $6^a$ is a sectional view on the line D D of Fig. 6.

Referring more in detail to the figures, it will be seen that I use in constructing a tank such as that shown in Figs. 1 and 2 square plates or sections of three different forms of flanging. These three forms are shown in detail in Figs. 4, 5, and 6, and are lettered $a$, $b$, and $c$, respectively. Each plate $a$ is provided with a right-angled flange $d$ on each of its four sides. The depth $x$ of each of these flanges is the same. The plates $b$ are provided with three right-angled flanges $g$ of the same depth as that of the flanges $d$ of the plate $a$. The other edge of the plate is provided with a beveled flange $t$, set at an angle of one hundred and thirty-five degrees to the face of the plate. The width or depth of this flange is equal to the diagonal of a square whose side is equal to the depth $x$ of the square flanges. The plates $c$ are formed with right-angled flanges $s$ on two adjacent sides, the depth of these flanges being the same as the flanges $d$ of the plates $a$. The other two sides of the plates are provided with beveled flanges $o$, similar to the flange $t$ of the plate $b$. The flanges are perforated for the reception of rivets or bolts in any convenient manner. In assembling a plurality of these individual plates or sections to form the bottom of a tank, such as that shown in Figs. 1 and 2, one of the plates $a$ is arranged with its flanges directed downward. To each of its four flanges there is secured one of the plates $b$ by its flange which is opposite to the beveled flange $t$. The corner-plates of the bottom of the tank consist of the plates $c$, which are secured by their right-angled flanges $s$ to the plates $b$.

The vertical sides of the tank are constructed of the plates $b$ and $c$, as seen in Fig. 2.

If a tank two plates or sections in depth be required, the additional section consists of plates $a$ and plates $b$. The flanges $t$ of the latter then form the corners for the extra depth of tank.

If a tank be required of larger area of bottom than that shown in the figures, a plurality of the plates $a$ and more of the plates $b$ may be used.

If the tank is required of a width equal to two plates only and but one plate high, none of the plates $a$ are necessary.

Having thus described my invention, what I claim as new, and desire to secure by Letters Patent, is—

1. A series of plates for forming sheet-metal tanks comprising a set of square plates $b$, each having right-angular flanges on three edges and the fourth edge inclined at an angle of one hundred and thirty-five degrees to the face of the plate, and another set of square plates *c* having two adjoining edges provided with right-angular flanges and the other two edges beveled or inclined at the same angle, substantially as described.

2. A tank composed of a series of square metal plates *a* having right-angular flanges on all four edges, a second series of square plates *b* having right-angular flanges on three edges and the fourth edge beveled to an angle of one hundred and thirty-five degrees to the face of the plate, the width of the beveled flange being equal to the diagonal of a square whose side is equal to the width of said right-angular flanges, and a third series of square plates *c*, having two adjoining edges provided with right-angular flanges and the other two edges beveled in the same manner as the plates *b*, substantially as described.

In witness whereof I hereunto set my hand in presence of two witnesses.

G. HERBERT LLOYD.

Witnesses:
 JAMES MAGUIRE,
 ROLAND RECORD.